Figure 1:
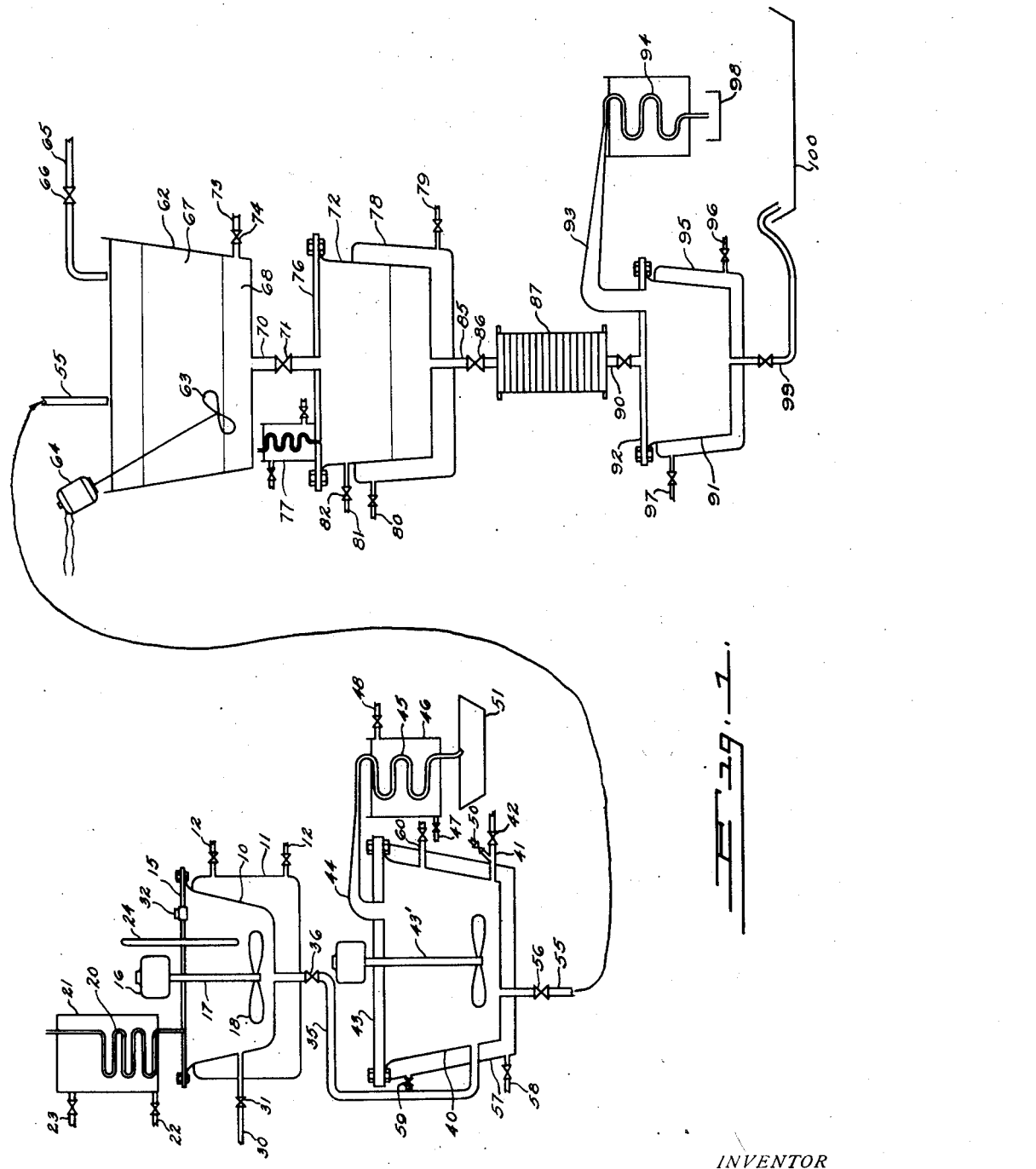

Dec. 15, 1931.  C. A. THOMAS ET AL  1,836,629
PREPARED RESIN
Filed July 21, 1928

INVENTOR
Charles A. Thomas and
BY Carroll A. Hochwalt
Maréchal and Noe
ATTORNEY

Patented Dec. 15, 1931

1,836,629

UNITED STATES PATENT OFFICE

CHARLES A. THOMAS AND CARROLL A. HOCHWALT, OF DAYTON, OHIO, ASSIGNORS, BY MESNE ASSIGNMENTS, TO DAYTON SYNTHETIC CHEMICALS, INC., OF DAYTON, OHIO, A CORPORATION OF OHIO

PREPARED RESIN

Application filed July 21, 1928. Serial No. 294,491.

This invention relates to the preparation of substances analogous in character and utility to the so-called natural resins; and one of the principal objects of this invention is to provide such a prepared substance which has characteristics markedly superior, in certain respects to the natural resins, and a method of, and apparatus for, preparing such substances.

Other objects and advantages of the present invention will be apparent from the description thereof set out below and from the drawing and appended claims.

The single view of the drawing is a diagrammatic representation of apparatus for practicing the method, and for producing the resin-like material of the invention.

The term "resin" has heretofore been generally utilized to designate certain naturally formed compounds, such as shellac, amber, the hardened product exuding from pine trees and known as rosin, and the like. These compounds have been long used in the arts, particularly in connection with the preparation of varnishes, lacquers and the like. Such compounds, when suitably dissolved and admixed with other proper constituents, go to produce these varnishes, lacquers, etc. However, the utilization of these natural resins has always presented a problem because the resin tends to retard the drying of linseed oil which is present in large quantities in varnish, etc. and also because they are saponifiable and so are attacked by acids. We have discovered that the prepared resins of our invention are free from these objectionable characteristics. They are non-acid in reaction and also they are unsaponifiable.

In the practicing of our invention to produce these prepared resins we preferably utilize an abundantly available product, namely cracked distillate such as that obtained from natural gas. Distillate cracked according to the various methods now prevalent, contains a substantial proportion of unsaturated hydrocarbons, the proportion, with respect to the total quantity of distillate, being dependent upon the method utilized in the cracking. While many of the cracked distillates ordinarily available will not include more than 4 or 5 per cent of these unsaturated hydrocarbons it is not at all unusual for fuel available on the market for use in automobiles to have an unsaturated content of 20 or perhaps 25 per cent. And by utilizing a sufficiently severe cracking process distillate can be secured having in excess of 50 per cent of unsaturated hydrocarbons. These unsaturated hydrocarbons are of course of uncontrolled character, in the sense that such hydrocarbons form according to the conditions of the reaction, in respect to any particular batch of distillate being treated. And consequently in the practicing of our method of producing prepared resins, we utilize an indeterminate mixture of unsaturated hydrocarbons, which may be of any possible character.

This unsaturated distillate is, preferably first "topped", by which we mean it is subjected to a rather rough or crude fractional distillation, to separate therefrom a portion consisting of a mixture of the lighter hydrocarbons. Very satisfactory results have been secured using a topped fraction having an end point of approximately 180° C. or less. This topped distillate is placed within the container or agitating chamber 10, which is in turn enclosed within a suitable water jacket 11, through which water may be flowed for either cooling or heating the container 10, and the material therein, to maintain a proper temperature range for the reaction to occur. Valve controlled inlet and outlet pipes 12 through which cooling or heating water may be introduced into the water jacket are shown. Of course any usual form of heat-controlled jackets may be utilized.

The container 10 is provided with a removable or detachable cover or top 15 which may be tightly clamped in position. This top carries a motor 16, mounted in any suitable fashion, the shaft 17 of which projects downwardly into the container and carries a suitable stirrer or agitator 18 upon the lower end. Leading off through the top from the interior of chamber 10 is a reflux condenser coil 20, positioned within a suitable cooling jacket 21 to which cooling liquid may be introduced through the valve controlled inlet 22 and discharged through the valve controlled discharge 23. The upper end of this condenser may be open, as the purpose of it is merely to condense and return to the container 10 any vapors that may be generated during the reaction, thus preventing both the loss of the generated vapors and the undue building up of pressures during the reactions. The thermometer 24 is provided so that the temperature within the container may be quickly checked. The unsaturated distillate, such as cracked gasoline, is introduced into the container through a supply pipe 30, controlled by a suitable valve 31. This pipe 30 may lead to any suitable source of supply of distillate. The top 15 is provided with a port, which is shown as being closed up by means of a removable plug 32, through which an activating compound, such as pulverized anhydrous aluminum chloride ($Al_2Cl_6$) is added to the unsaturated distillate within the container.

The aluminum chloride is added in small quantities at a time. Presuming, for example, that 4,000 cc. of cracked distillate having approximately 50 per cent of unsaturated hydrocarbons is introduced into container 10, anhydrous aluminum chloride may be satisfactorily added in quantities of approximately 10 grams at a time. With the addition of the first batch of aluminum chloride the agitator 18 should be started and as the aluminum chloride is introduced into the agitated distillate, so that it is brought into intimate contact there is a resulting activity of some character or polymerization which causes a decided rise in temperature. Approximately 10 gr. of aluminum chloride added to the 4,000 cc. of distillate will cause the temperature to rise from normal temperature, of say 23° C. to approximately 40° C., which temperature has been found to give a very satisfactory end product. If necessary the jacket 11 may be utilized to maintain this temperature. Additional batches of aluminum chloride are added from time to time as may be done without unduly increasing the temperature within container 10 until no additional temperature rise results. The amount of aluminum chloride used will depend upon the proportion of unsaturated hydrocarbons, and perhaps upon their character, and therefore it is a very satisfactory practice to add aluminum chloride until no further temperature rise is secured. Inasmuch as the aluminum is ultimately recovered the addition in excess is not a detriment.

With 4,000 cc. of a 50 per cent unsaturated distillate as referred to above, it will ordinarily take approximately 50 grams to complete the conversion of the unsaturated compounds.

It should be stated that in addition to aluminum chloride other compounds which hyrolyze in water giving an acid reaction will function satisfactorily to cause the conversion of the unsaturated hydrocarbons into resins,—for example, chlorides of iron, boron, zinc, antimony, indium, titanium and tin; benzene sulfonic acid; propyl alcohol saturated with HCl gas; ethyl sulfate, and aniline hydrobromide.

When the conversion within the container 10 has been completed the material within the container will be a viscous dark-colored one. This material is flowed from the container through the outlet pipe 35 controlled by a suitable valve 36 into a steam distillation vessel or container 40. This particular part of the apparatus is shown in a very diagrammatic character and may be of widely varying character. As shown the viscous reaction product is flowed into the container 40 to the desired height. This container has a steam inlet pipe 41, controlled by a suitable valve 42. The container is provided with a removable top 43 carrying a motor operated stirrer 43' and a distillation discharge pipe 44 which leads to a condenser coil 45, within a suitable condenser jacket 46, through which cooling water may be introduced through valve-controlled pipe 47 and discharged through valve-controlled pipe 48. Steam is introduced through the pipe 41. Also at the beginning of the steaming action an excess over the theoretical amount of a water solution of alkali required to neutralize all of the aluminum chloride previously utilized by introduction into the container 10 is passed into the distillation vessel 40; preferably about twice the theoretical amount is used. This can be introduced through any desired apparatus, the drawing showing the pipe 41 as provided with a valve branch 50 through which the alkali may be introduced. The agitator 43' is then started in order to stir up the reaction mass and secure effective admixture with the neutralizing agent, and to secure more effective steam distillation. Various water soluble alkalies might be used, but preferably sodium hydroxide or ammonium hydroxide, which will permeate all through the mass of reaction product and therefore function effectively to neutralize all of the aluminum compound. During this portion of the treatment the almuinum chloride and alkali, such as sodium hydroxide, in the presence of water will react to form aluminum hydroxide ($Al_2(OH)_6$) and sodium chloride (NaCl).

During this steaming action the saturated, or other hydrocarbons, which have not been affected by the aluminum chloride, will be distilled off, and will pass off along with the steam through the pipe 44 and be condensed, the condensed water and recovered hydrocarbons being collected in any suitable container shown diagrammatically as a closed vessel 51. While treatment by the introduction of steam is described above it is not essential, it being only needful that the reaction product be treated with a compound containing a hydroxyl radical such as water to decompose the aluminum chloride. But since the unacted upon hydrocarbons should be distilled off at this stage preferably steam or boiling water is used.

During the steaming, the reaction product within the vessel 40 changes color and becomes first green and then a putty color, in fact looking very much like white putty. During this change the saturated hydrocarbons, and some of the heavier oils occluded within the viscous mass, are driven off. The white or putty color is apparently due to the finely divided aluminum hydroxide particles and sodium chloride particles which are distributed through the reaction product and will not come out during the steaming action, and to occluded water.

After the steaming action is completed, which will ordinarily take several hours, the putty-like product is removed from the vessel 40 and treated with a hydrocarbon solvent, preferably benzol, although other suitable solvents which are immiscible in water, such as carbon tetrachloride and ethylene dichloride, may be used. The putty-like product may be removed from the vessel 40 by heating until the mass is molten when it may be discharged through the outlet pipe 55 controlled by a valve 56. For this purpose the vessel 40 is provided with a steam jacket 57 having controlled steam inlet and outlet connections 58 and 59. Preferably the putty-like mass is first treated in the hydrocarbon solvent, such as benzol, which is introduced into the vessel 40 by the valve-controlled inlet pipe 60, the vessel being heated by the steam jacket and stirred with agitator 43' to effect solution of the resin in the benzol. When so dissolved a colloidal mass is produced, the resin like compounds going into solution in the benzol and the aluminum hydroxide and water forming the colloidal portion.

The colloidal mass is flowed by gravity through the outlet pipe 55 into an open vessel 62 equipped with a suitable stirrer such as an electric stirrer having agitating blades 63 driven by an electric motor 64. A water soluble liquid, or one which is miscible with water in all proportions, and which is active to precipitate the resin, such as alcohol or acetone, is then added to the benzol solution through the supply pipe 65 controlled by a valve 66. Generally a volume of alcohol which is equivalent to about twice the volume of the colloidal solution is added. This serves to precipitate the prepared resin compound, the mass separating out into two layers 67 and 68. The lower layer 68 comprises the precipitated resin and the aluminum hydroxide and sodium chloride. The upper layer comprises a mixture of benzol and alcohol together with some dissolved higher oils which remain in solution in the benzol, and water which is taken up in the alcohol. The contents of vessel 62 are agitated during the addition of the alcohol, and then are allowed to settle or stratify into the two layers above described.

The layers are then separated in any suitable manner such as by decanting. Preferably the lower layer is flowed by gravity through a passage 70 controlled by a valve 71 into another vessel 72. The alcohol and benzol mixture is then withdrawn for reclaiming purposes or for use through the discharge pipe 73 controlled by a valve 74. If it is desired to reclaim and separate the alcohol and benzol, this may be readily accomplished by adding a quantity of water to the mixture, when the benzol will separate in a layer distinct from a mixed alcohol and water layer, when they may be separated by decanting. The resin now in the vessel 72 is in a semi-solid form. The vessel 72 is provided with a tight fitting cover 76 and with a reflux condenser 77 to condense any volatile products and return them to the vessel 72 as well as to prevent any undue pressure rise therein. The vessel 72 is also provided with a steam jacket 78 having valve-controlled steam inlet and outlet connections 79 and 80, as well as with a benzol or other hydrocarbon solvent inlet pipe 81 controlled by a valve 82. Benzol is then added to the semi-solid resin in the vessel 72 and the same is heated by the steam jacket to effect solution of the resin therein. In the absence of water which has been removed by the alcohol in the previous treatment, a granular precipitate is formed which can be readily filtered. Sodium chloride remaining in the mass also remains in the precipitate.

In the appended claims, for the sake of brevity, the term "activating agent" is used to refer to the activating agent in its initial form, as for example, anhydrous aluminum chloride; and the term "precipitated activating agent" is used to refer to decomposition products of such activating agent which are precipitated during the process as herein described.

The precipitate is removed by filtering in any suitable manner such as through a chamois filter press or in a centrifuge. As shown, the liquid mass and precipitate is flowed through the discharge pipe 85 controlled by valve 86 into a filter press 87 illustrated diagrammatically. The filtrate including the purified resin dissolved in benzol passes through the valve controlled pipe 90 into a distillation vessel 91 having a close fitting cover 92 and a distillation off-take pipe 93 leading to a condenser 94. The vessel 91 is also provided with a steam jacket 95 having valve controlled steam inlet and outlet connections 96 and 97. Vessel 91 is then heated by the steam jacket which serves to distill off the benzol and any occluded water remaining in the mass, the benzol being condensed by the condenser 94 and recovered in a vessel illustrated diagrammatically at 98. Immediately after the distillation and while the resin is still molten, it is flowed by gravity through the discharge pipe 99 into a shallow pan 100, or into a plurality of such shallow pans, where the resin is allowed to cool and harden. While any suitable form of feed from one vessel to another of the system may be provided, a gravity feed through out the entire system such as disclosed herein is preferred for commercial installations.

The resin obtained is rather soft due to the presence of some higher oils. If hard resin, free from the higher oils is desired, the resin may be again placed in a hydrocarbon solvent such as benzol and reprecipitated by alcohol or acetone, the higher oils remaining in solution in the benzol and alcohol mixture. This solution mixture may be separated by decanting the two formed layers in the manner above described, and the precipitate may then be heated under vacuum which drives off all alcohol and benzol, and a clear brittle resin results.

The resin so prepared in accordance with our invention is found to have a brown shading to dark amber color. When dissolved in a suitable oil solvent, such as naphtha, the resin forms a clear amber liquid, which when brushed onto a surface leaves a clear film which is practically colorless or has only a faint yellowish color. A characteristic feature of this prepared resin is its high molecular weight. The molecular weight, particularly when treated with the activating agent at higher temperatures (about 40° C.), is generally over 1300 and often approaches 1500. The prepared resin is non-acid in reaction, and is unsaponifiable. Another very important and desirable characteristic of the prepared resin is that it does not retard the drying of linseed oil, so that a varnish can be prepared with this resin which compares favorably in speed of drying with lacquers.

The term "cracked distillate" is herein used to denote distillate obtained in the process of cracking petroleum and natural gas, as distinguished from coal tar distillate, such as that commonly known as "solvent naphtha", and which has been employed to produce resins of the coumarone-indene type, the constituents of which are largely aromatic in character. The cracked distillate employed in the present invention is of quite different character, being largely aliphatic in character and substantially free from coumarone-indene constituents.

While the method herein described and the apparatus for carrying out that method and the products so produced constitute preferred embodiments of our invention it is to be understood that the invention is not limited to this precise method or apparatus, or precise product, and that changes may be made therein without departing from the scope of the invention which is defined in the appended claims.

What is claimed is:

1. As a composition of matter, a highly polymerized hard pulverizable synthetic resin produced from cracked petroleum distillate, substantially completely soluble at all stages of polymerization in benzol and gasoline and substantially completely insoluble in alcohol and acetone, the resin being substantially non-acid, unsaponifiable and a non-retarder of the drying of linseed oil.

2. As a composition of matter, a resinous reaction product formed by inter-reaction and polymerization in the presence of a metallic halide activating agent, of a mixture of unsaturated hydrocarbon compounds of varying degrees of unsaturation and having boiling points below 180° C., consisting of a substantial number of the members of the group of hydrocarbons present in a fraction of cracked petroleum distillate, said resinous reaction product being substantially completely soluble in benzol and naphtha, substantially free from halides and capable of being hardened to a pulverizable amorphous solid as distinguished from a soft and elastic caoutchouc-like material.

3. A new composition of matter comprising the homogeneous resinous reaction product formed in the presence of a metallic halide activating agent from the unsaturated hydrocarbon compounds having boiling points below 180° C. present in a fraction of cracked petroleum distillate, said resinous product being substantially completely insoluble in alcohol and acetone and substantially completely soluble in benzol and naphtha.

4. A solid substantially neutral amber colored resin comprising the reaction product of a mixture of unsaturated hydrocarbons of varying degrees of unsaturation consisting of a substantial number of the members of the group of hydrocarbons present in a fraction of cracked petroleum distillate and substantially free from coumarone-indene constituents, formed in the presence of a metallic halide activating agent, said resin being substantially free from metal and halogen compounds, substantially completely insoluble in alcohol and acetone, and capable of forming a clear light colored solution in benzol and naphtha.

5. A solid substantially neutral amber colored resin formed from a fraction of cracked petroleum distillate, said resin being substantially completely soluble in benzol and gasoline and substantially completely insoluble in alcohol and acetone.

6. The method of producing prepared resins, which comprises agitating with a metallic halide activating agent added in chemically uncombined form, a mixture of unsaturated hydrocarbons of varying degrees of unsaturation consisting of a substantial number of the members of the group of hydrocarbons present in cracked petroleum distillate, introducing steam into the reaction product to decompose and precipitate the metallic halide activating agent, and separating the precipitated activating agent from the resinous reaction product.

7. The method of producing prepared resins which comprises agitating a fraction of cracked petroleum distillate and a metallic halide activating agent added in solid form in successive controlled amounts to produce a resinous reaction product admixed with heavy oils, adding to the resulting mass an alkali to neutralize the activating agent with decomposition and precipitation of the activating agent, adding to the reaction mass a solvent for the resinous reaction product in which the precipitated activating agent is insoluble, separating the precipitated activating agent from the solution of resinous product, heating the solution to separate the resinous product from the solvent, and further heating the resinous product to remove remaining heavy oils and harden the resinous reaction product.

8. The method in the production of prepared resins which comprises as steps thereof polymerizing a fraction of cracked petroleum distillate substantially free from coumarone-indene constituents, with a metallic halide which hydrolyzes to give an acid reaction, added in solid form, and neutralizing the reaction product with an alkaline ammonium compound.

9. The method of producing prepared resins which comprises reacting a mixture of unsaturated hydrocarbon compounds consisting of a substantial number of the members of the group of hydrocarbons present in a fraction of cracked petroleum distillate, said hydrocarbons having boiling points below 180° C. and being substantially free from coumarone-indene constituents, in the presence of a metallic halide activating agent added in chemically uncombined form, adding to the reaction mixture water which acts as a splitting agent to break down and precipitate the activating agent, adding to the resultant mass a solvent for the resinous reaction product, and separating the precipitated activating agent from the resinous reaction product after such addition of solvent.

10. A method in the production of a synthetic resin which comprises reacting a mixture of unsaturated hydrocarbons of varying degrees of unsaturation consisting of a substantial number of the members of the group of hydrocarbons present in cracked petroleum distillate, with a metallic halide activating agent which gives an acid reaction in water, added in a chemically uncombined state, neutralizing the reaction mixture with ammonia in the presence of water to break down and precipitate the metallic halide activating agent, and separating the precipitated activating agent from the dissolved resinous reaction product.

11. The method in the production of a synthetic resin which comprises as a step thereof treating a petroleum cracked distillate fraction containing in excess of 40% by weight of unsaturated hydrocarbons with a metallic halide activating agent added in solid form in sufficient amount to produce substantially complete polymerization of resin-forming constituents.

12. The method in the production of a synthetic resin which comprises as a step thereof reacting a cracked petroleum distillate fraction containing in excess of 50% by weight of a mixture of unsaturated hydrocarbons of varying degrees of unsaturation having boiling points below 180° C. in the presence of a metallic halide activating agent added in a chemically uncombined state.

13. The method of producing a synthetic resin which comprises as steps thereof adding a metallic halide activating agent in solid form in successive controlled amounts with agitation to a mixture of a substantial number of the unsaturated hydrocarbons present in a fraction of cracked petroleum distillate, while cooling the reaction mass to prevent a temperature rise above 60° C., and continuing the addition of the metallic halide until substantially no further temperature rise due to the exothermic heat of reaction takes place.

14. The method of producing a synthetic resin which comprises as a step thereof reacting a fraction of cracked petroleum distillate substantially free from coumarone-indene constituents and containing more than 50% of unsaturated hydrocarbons, in the presence of more than 1% by weight of anhydrous aluminum chloride, added in a chemically uncombined state.

In testimony whereof we hereto affix our signatures.

CHARLES A. THOMAS.
CARROLL A. HOCHWALT.